US012698155B2

(12) United States Patent
Puntigam et al.

(10) Patent No.: US 12,698,155 B2
(45) Date of Patent: Aug. 4, 2026

(54) METHOD FOR STORING OR RETRIEVING STORAGE AIDS

(71) Applicant: Knapp AG, Hart bei Graz (AT)

(72) Inventors: Wolfgang Puntigam, Hart bei Graz (AT); Franz Mathi, Hart bei Graz (AT); Christoph Gailberger, Hart bei Graz (AT)

(73) Assignee: Knapp AG, Hart bei Graz (AT)

( * ) Notice: Subject to any disclaimer, the term of this patent is extended or adjusted under 35 U.S.C. 154(b) by 354 days.

(21) Appl. No.: 18/576,959

(22) PCT Filed: Jun. 30, 2022

(86) PCT No.: PCT/AT2022/060235
§ 371 (c)(1),
(2) Date: Jan. 5, 2024

(87) PCT Pub. No.: WO2023/279127
PCT Pub. Date: Jan. 12, 2023

(65) Prior Publication Data
US 2025/0100796 A1 Mar. 27, 2025

(30) Foreign Application Priority Data
Jul. 8, 2021 (AT) .............................. A 50564/2021

(51) Int. Cl.
*B65G 1/04* (2006.01)
*B65G 1/137* (2006.01)

(52) U.S. Cl.
CPC ............. *B65G 1/0492* (2013.01); *B65G 1/04* (2013.01); *B65G 1/0471* (2013.01); *B65G 1/1375* (2013.01)

(58) Field of Classification Search
CPC ...... B65G 1/04; B65G 1/0414; B65G 1/0471; B65G 1/0492; B65G 1/065; B65G 1/1375;
(Continued)

(56) References Cited

U.S. PATENT DOCUMENTS 4,299,496 A 11/1981 Lord
6,149,366 A * 11/2000 Deandrea ............. B65G 1/0414
414/279
(Continued)

FOREIGN PATENT DOCUMENTS

CN 104039666 B 3/2018
CN 110356754 A * 10/2019 ............... B65G 1/04
(Continued)

OTHER PUBLICATIONS

Non-Final Office Action dated May 12, 2026 in connection with U.S. Appl. No. 18/576,921.

*Primary Examiner* — Jacob S. Scott
*Assistant Examiner* — Temesgen M. Maru
(74) *Attorney, Agent, or Firm* — Eschweiler & Potashnik, LLC

(57) ABSTRACT

A method of storing or retrieving storage aids with a shuttle in a rack of an automated storage system, the rack including several rack supports placed on a ground and several storage levels including storage spaces, includes moving underneath the rack with the shuttle; a vertical ascent of the shuttle on adjacent rack supports; storing the storage aid from the shuttle into the storage space or retrieving the storage aid from the storage space onto the shuttle; and a vertical descent of the shuttle characterized by: moving out of the rack and/or moving in under the rack on the ground with a direction of travel along the longitudinal axis of the shuttle; rotating the shuttle by 90 degrees; coupling the shuttle by approaching only two of the adjacent rack supports, with the (Continued)

longitudinal axis of the shuttle positioned in parallel to a rack front.

19 Claims, 11 Drawing Sheets

(58) Field of Classification Search
CPC .......... B65G 57/302; B65G 2201/0235; B65G 2201/0258
See application file for complete search history.

(56) References Cited

U.S. PATENT DOCUMENTS

| | | | | |
|---|---|---|---|---|
| 9,181,030 | B2 * | 11/2015 | Zombori | .................. B65G 1/04 |
| 10,730,696 | B2 * | 8/2020 | Moulin | ................ B65G 1/1378 |
| 12,006,149 | B2 * | 6/2024 | Lert, Jr. | ............... B65G 1/0492 |
| 2015/0225187 | A1 | 8/2015 | Razumov | |
| 2017/0101263 | A1 | 4/2017 | Schroer | |
| 2020/0122923 | A1 * | 4/2020 | Moulin | ................ B65G 1/0435 |
| 2021/0047112 | A1 | 2/2021 | Stevens et al. | |
| 2021/0047118 | A1 * | 2/2021 | Stevens | ................ B65G 1/1375 |
| 2022/0048709 | A1 * | 2/2022 | Valinsky | ............. B65G 1/1378 |
| 2022/0153523 | A1 * | 5/2022 | Bastian, II | ........... B25J 15/0616 |
| 2023/0391550 | A1 * | 12/2023 | Vandemergel | ........... B65G 1/02 |
| 2024/0025645 | A1 * | 1/2024 | Moulin | ................ B65G 1/1375 |

FOREIGN PATENT DOCUMENTS

| | | | | | |
|---|---|---|---|---|---|
| CN | 111517050 | A | * | 8/2020 | ........... B60K 17/342 |
| DE | 102018117096 | A1 | | 1/2020 | |
| EP | 1348646 | A2 | | 10/2003 | |
| EP | 3131837 | B1 | | 8/2022 | |
| FR | 3042182 | B1 | | 9/2020 | |
| KR | 20210023297 | A | | 3/2021 | |
| KR | 102887615 | B1 | | 11/2025 | |
| WO | 2012113679 | A1 | | 8/2012 | |
| WO | 2017064401 | A1 | | 4/2017 | |
| WO | 2019238697 | A1 | | 12/2019 | |

* cited by examiner

METHOD FOR STORING OR RETRIEVING STORAGE AIDS

This application is a National Phase entry application of International Patent Application No. PCT/AT2022/060235 filed Jun. 30, 2022, published as WO 2023/279127, which claims the benefit of and priority from Austrian Patent Application No. A50564/2021 entitled "Automatisiertes Lagersystem," filed Jul. 8, 2021, the entire disclosures of these prior applications are incorporated herein by reference.

Automated storage systems are known in the field of warehouse logistics for automatically storing goods in a warehouse store using a storage method and retrieving them therefrom. Such storage systems and storage methods are used in modern logistics to allow purchase orders to be fulfilled swiftly, quickly and individually. For this purpose, storage systems usually comprise means for picking goods in order to process purchase orders that comprise a variety of different products. However, such storage systems are also used as warehouses, e.g., in the automotive industry, where, for example, a large number of different components have to be stored in a common warehouse and must be available at short notice.

In the prior art, storage systems are known which are designed in the form of high-bay rackings. Therein, goods are stored in storage spaces that are formed by the racks. Such storage systems usually comprise so-called stacker cranes which perform the storage and retrieval of goods in and out of the storage spaces.

A disadvantage of known storage systems and storage methods is that the stacker cranes that store and retrieve the goods move within the storage system along predetermined paths. This results in waiting times when the goods are being stored in the storage spaces and retrieved therefrom, especially if a stacker crane has to process another order beforehand. What may happen furthermore is an accumulation of goods, for example, when goods are being picked up or transferred between the storage system and a conveyor belt.

It is therefore the object of the invention to provide a method of storing or retrieving storage aids with a shuttle in a rack of an automated storage system which allows goods to be handled swiftly and flexibly and increases the throughput of goods.

This is achieved by the features of the method according to the invention of storing or retrieving storage aids having the features of claim 1.

The method according to the invention is designed for storing or retrieving storage aids with a shuttle in a rack of an automated storage system. In this case, the rack comprises several rack supports placed on a ground and several storage levels arranged vertically one above the other and comprising storage spaces arranged between the rack supports. Adjacent rack supports of the rack which limit the width of a storage space have a clear width on the ground that is smaller than the length of the shuttle in a longitudinal axis of the shuttle and larger than the width of the shuttle in a transverse axis of the shuttle. In the method according to the invention, the steps described below are carried out. The shuttle is moved underneath the rack on the ground, and the shuttle is coupled to adjacent rack supports of the rack. The shuttle performs a vertical ascent on these adjacent rack supports up to the height of the storage level of the storage space into which the storage aid is to be stored or from which the storage aid is to be retrieved. Subsequently, the storage aid is stored from the shuttle into the storage space or the storage aid is retrieved from the storage space onto the shuttle. In addition, the method according to the invention comprises the vertical descent of the shuttle on the adjacent rack supports down to the ground. According to the invention, the method furthermore comprises the steps of moving out of the rack and/or moving in under the rack on the ground by the shuttle with a direction of travel along the longitudinal axis of the shuttle, as well as rotating the shuttle by 90 degrees. In addition, the method comprises the step of coupling the shuttle by approaching only two of the adjacent rack supports, with the longitudinal axis of the shuttle being positioned essentially in parallel to a rack front of the rack. By moving out of the rack and/or moving in under the rack on the ground by the shuttle with a direction of travel along the longitudinal axis of the shuttle, rotating the shuttle by 90 degrees outside of the rack and coupling the shuttle by approaching only two of the adjacent rack supports, the advantage is obtained that a small amount of space is required for the coupling-in process and the path from or to the two rack supports. The shuttle can thus always take the shortest path to the rack supports and hence to the desired storage space within the storage system on the ground, whereby the speed of storing and retrieving is significantly increased. In addition, the throughput of goods in the storage system is significantly increased by the method according to the invention, since a large number of possible access routes are provided for the individual shuttles, whereby the shuttles can easily avoid each other and do not have to wait for other shuttles to pass by.

In the method according to the invention, the shuttle is preferably positioned in front of the only two adjacent rack supports before being coupled to the only two adjacent rack supports by approaching the only two adjacent rack supports with a direction of travel along the transverse axis of the shuttle. In this way, the advantage is obtained that the shuttle can directly approach the rack supports and a simple mechanism for coupling to the two adjacent rack posts can be implemented.

According to a preferred embodiment of the method according to the invention, the shuttle is positioned with a movement in the direction of travel of the longitudinal axis of the shuttle after the shuttle has been rotated and before it is coupled to the only two adjacent rack supports. As a result, the rack aisles can also be used for the travel of the shuttle.

After moving underneath the rack, the shuttle preferably moves on the ground in an oncoming traffic area with other shuttles, which have a direction of travel that is oriented essentially opposite to the shuttle. As a result, the direction of travel of the individual shuttles can be coordinated with each other, and the individual shuttles can move autonomously in the storage system.

According to the preferred embodiment of the method according to the invention, the vertical ascent and/or the vertical descent of the shuttle is performed on the only two adjacent rack supports by means of a friction wheel coupling. A particularly quick coupling and decoupling process with a structurally simple and robust coupling mechanism is ensured in this way.

The shuttle preferably has a load handling device for accommodating the storage aid, wherein the load handling device with the storage aid picked up by the load handling device is moved from a guide for the load handling device which is provided on the shuttle into a guide for the load handling device which is provided on the storage space, when the storage aid is stored from the shuttle into the storage space. When the storage aid is retrieved from the storage space onto the shuttle, the storage aid is picked up by the load handling device and the load handling device with the accommodated storage aid is preferably moved from the guide for the load handling device which is provided on the storage space into the guide for the load handling device which is provided on the shuttle. In this way, it is ensured that the storage aid is stored and retrieved safely. Furthermore, the load handling device is preferably controlled by means of a control unit depending on the position of the shuttle in the storage system. As a result, the coordination between the load handling device, the storage aid and the shuttle is improved.

The automated storage system according to the invention, in which the method according to the invention is implemented, comprises at least one rack with several rack supports placed on a ground. The rack has several storage levels arranged vertically one above the other, each storage level comprising at least one storage space. In addition, the storage system comprises several storage aids that can be stored in the storage spaces. Storage aids comprise, for example, storage containers, storage pallets, trays, cartons and similar devices for holding goods that are known in the field of logistics. Moreover, the storage system comprises at least one shuttle comprising a drive unit, the shuttle being movable on the ground by means of the drive unit, and designed for accommodating a storage aid and for supplying it to one of the storage spaces and removing it therefrom. Furthermore, the storage system according to the invention comprises at least one load handling device which is designed for storing the storage aid from the shuttle into the storage space and for retrieving it from the storage space onto the shuttle. A transfer area is provided between the ground and a lowest storage level of the rack, the transfer area having a height which corresponds at least to a height of a shuttle with a storage aid picked up by the shuttle. The shuttle is displaceable independently along at least one of the rack supports by means of the drive unit.

As a result of the design according to the invention of the automated storage system, an additional transfer area disposed below the lowest storage level is provided. Thus, the shuttles can preferably move also on the ground below the lowest storage level. As a result, much greater flexibility in the possible paths of the shuttles in the storage system according to the invention is achieved than what is possible with storage systems according to the prior art. Due to the increased number of possible paths that are available for a shuttle during the supply or removal of a storage aid to and from a storage space, the throughput of goods and the speed of the storage system according to the invention can be increased significantly in comparison to the prior art. The movability of the shuttle along at least one of the rack supports allows the shuttle to transfer the storage aid from the transfer level into one of the storage levels.

In the region of the transfer area, the rack supports preferably have a coupling-in area for accommodating the shuttle. As a result, the advantage is obtained that the shuttle is displaceable on the ground in the transfer area independently of the rack supports and, simultaneously, can be coupled into the rack supports.

According to the preferred embodiment variant of the storage system according to the invention, the storage spaces each have a guide for guiding the load handling device. As a result, the load handling device can engage the guide and can position a storage aid on a storage space or remove it from the storage space, transferring it to the shuttle. The load handling device is preferably designed so as to be independent of the shuttle. Alternatively, the load handling device can also be mechanically and/or electrically coupled to the shuttle.

The drive unit of the shuttle preferably has at least two drive wheels for moving the shuttle along on the ground. As a result, the shuttle is able to perform rotary movements and curved changes of direction on the ground.

According to the preferred embodiment variant of the storage system according to the invention, the drive unit of the shuttle has a rack support coupling unit, the rack support coupling unit being designed for coupling the shuttle with the rack support. A simple, robust and detachable connection of the shuttle with the rack support is enabled in this way. Preferably, the rack support coupling unit is designed for establishing a frictional connection with the rack support. As a result, easy-to-manufacture and cost-effective tubular profiles or rolled profiles can be used for the rack support.

Advantageous embodiments of the method according to the invention of storing or retrieving storage aids in a rack of an automated storage system as well as alternative embodiment variants of the method and the storage system are explained in further detail below with reference to the figures.

FIG. 3*a* to FIG. 3*e* show a shuttle of the automated storage system in different views.

Figure 4A:
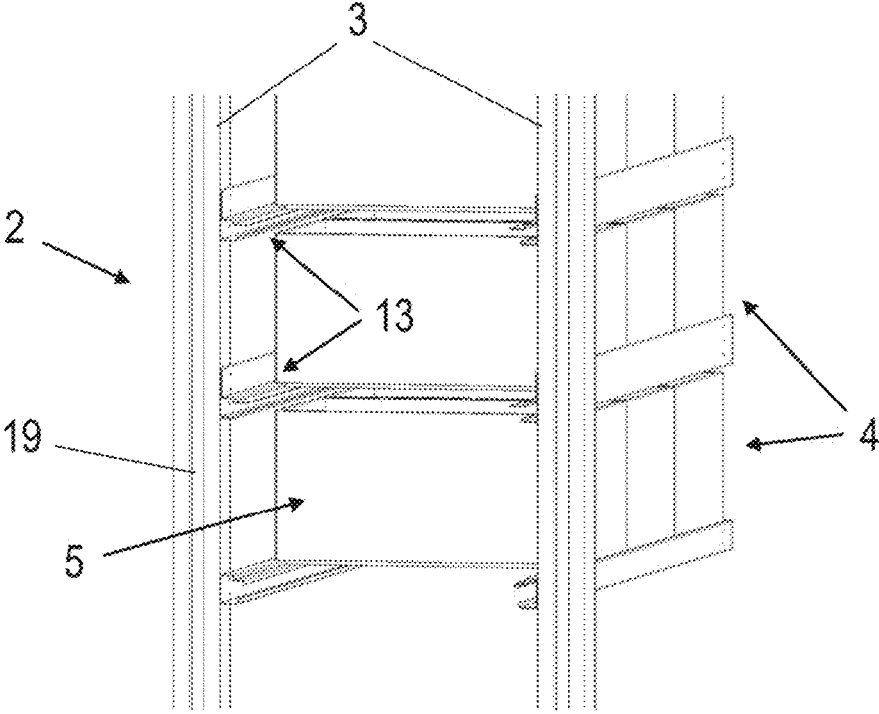
Figure 4B:
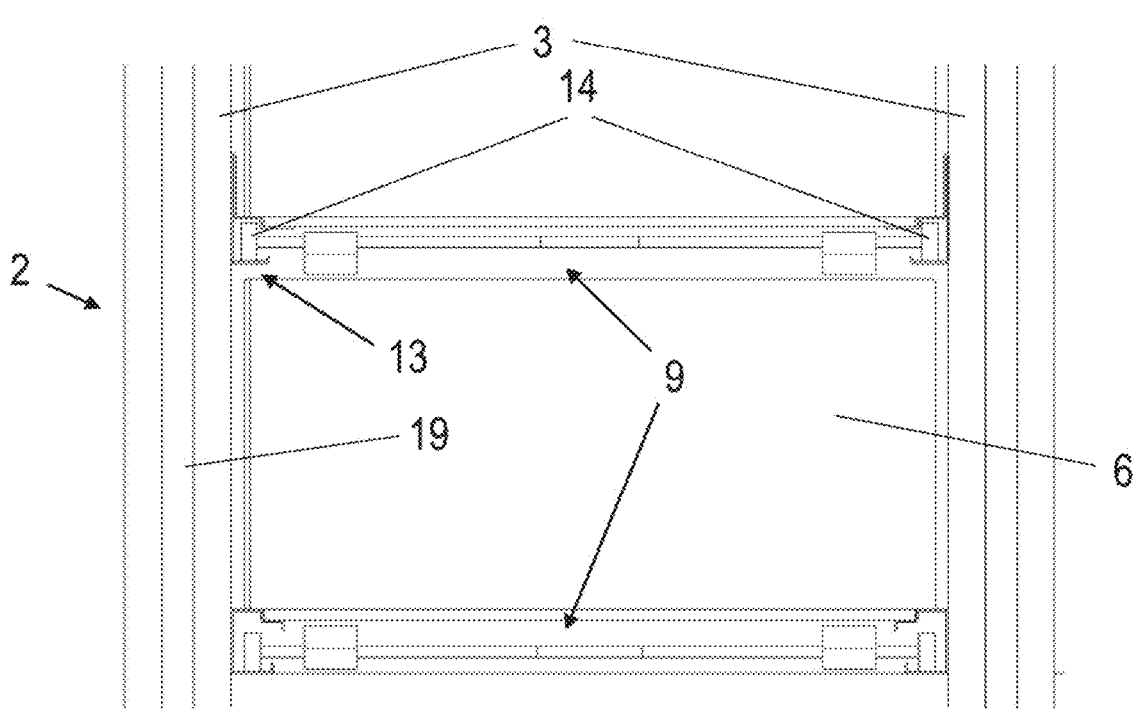
Figure 4C:
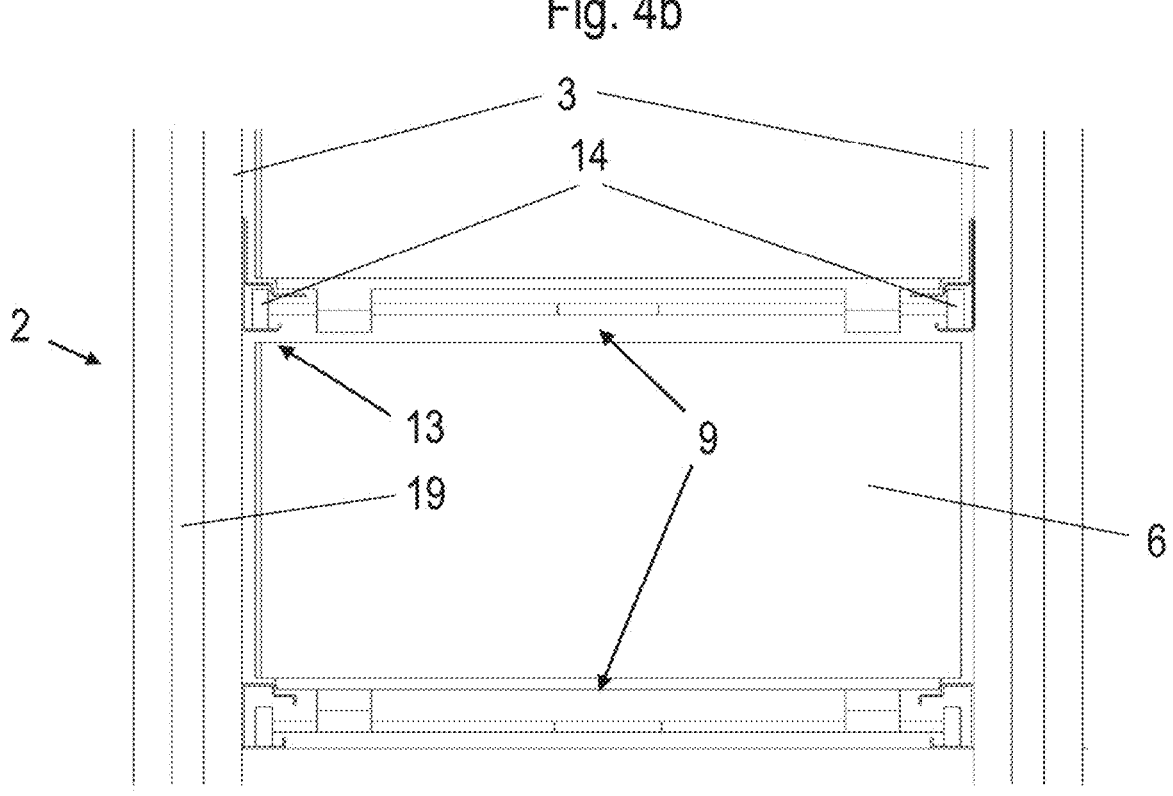

FIG. 4*a* to FIG. 4*c* show a section of the rack of the storage system comprising several storage spaces and guides in which load handling devices are accommodated.

FIG. 5*a* to FIG. 5*e* show different views of several shuttles which are coupled to a support with one rack support coupling unit each, the support having a curvature.

Figure 6A:
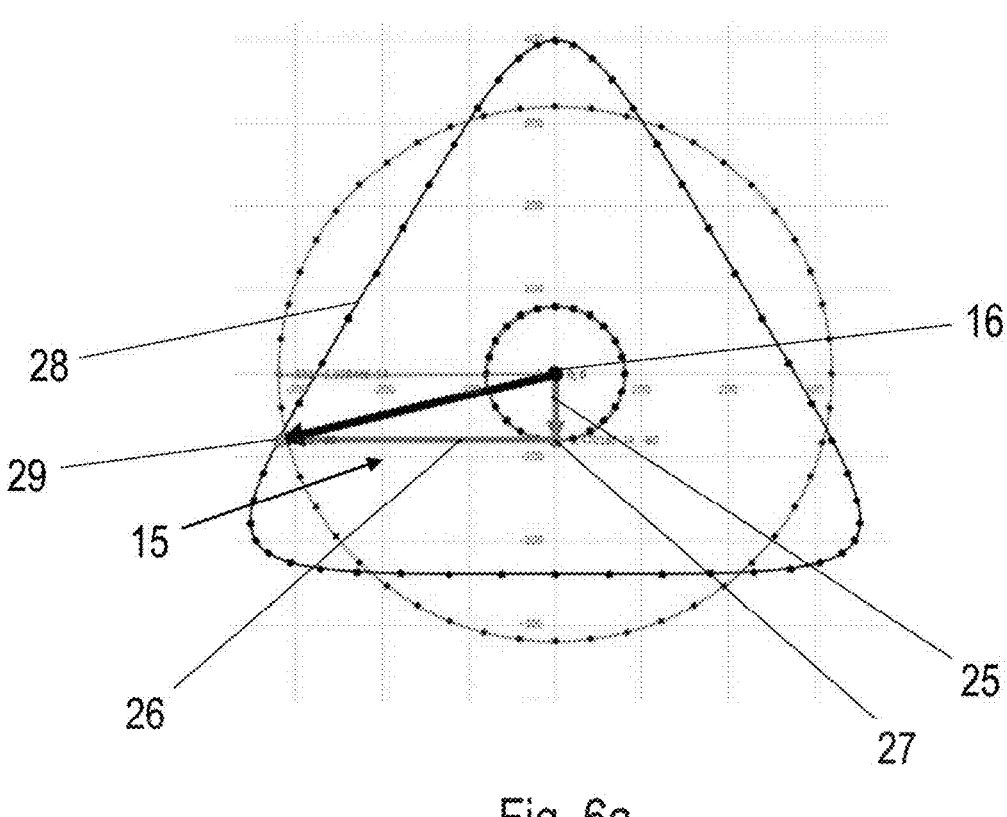
Figure 6B:
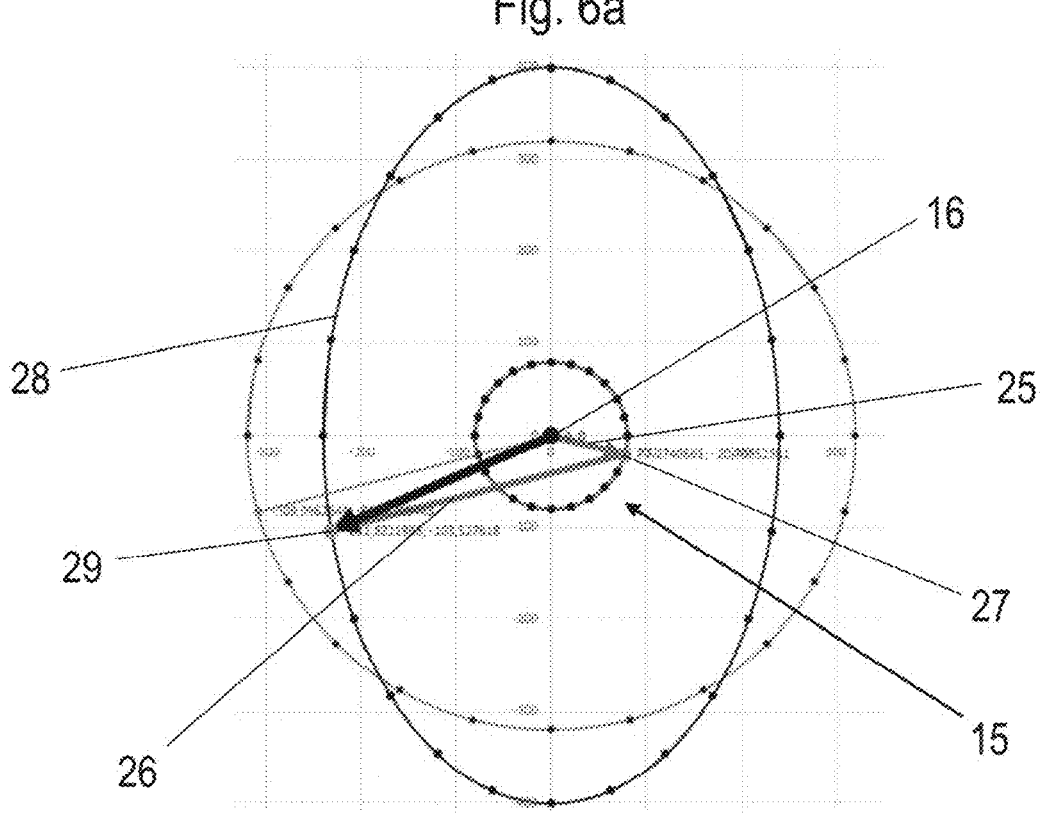

FIG. 6*a* and FIG. 6*b* show different configurations of a coupling arm of a shuttle of the storage system.

Figure 7:
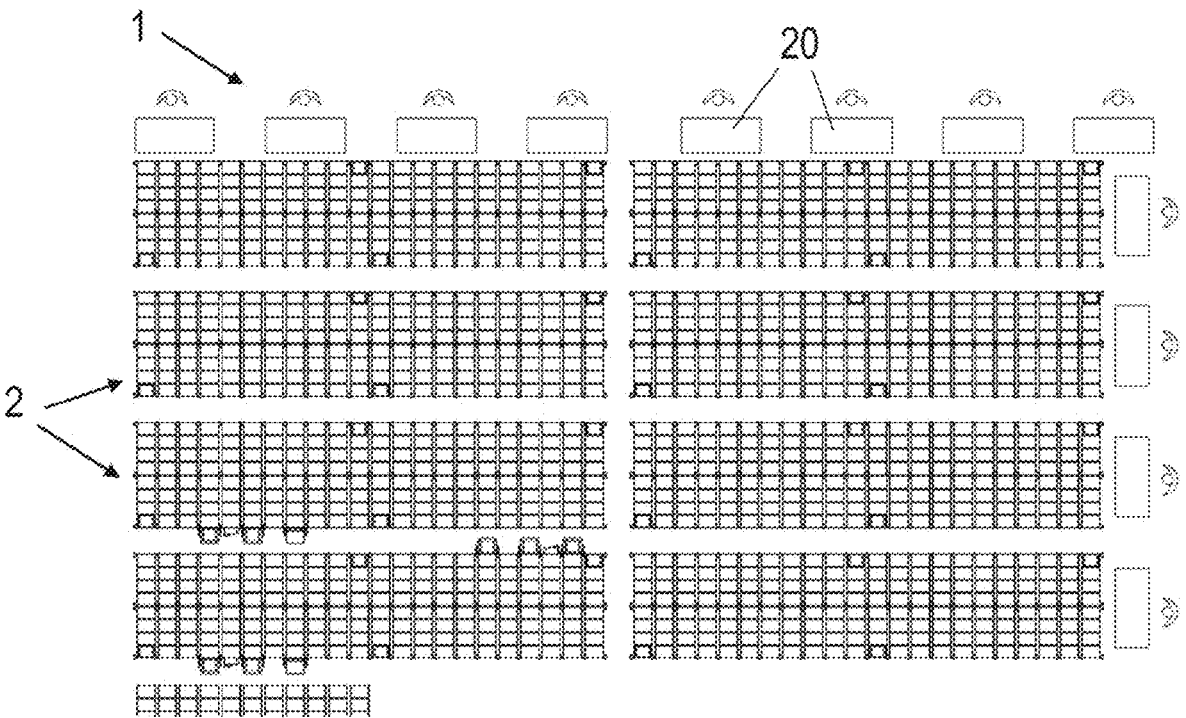

FIG. 7 shows the automated storage system in a view from above with several workstations.

Figures 1, 2:
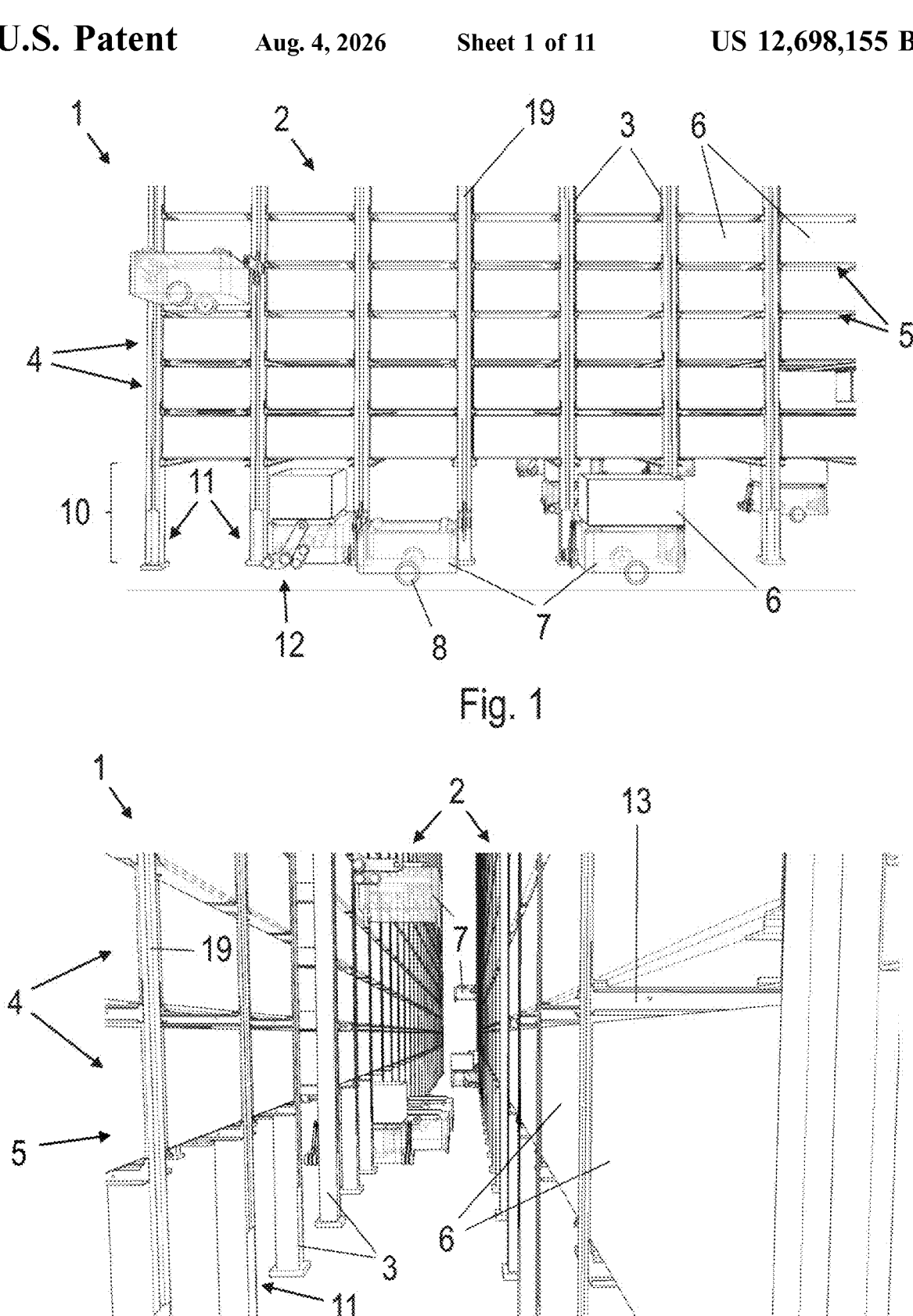
FIG. 1 shows an automated storage system in a perspective view with a rack and several shuttles, in which the method according to the invention is used.
FIG. 2 shows a storage aisle of the rack system according to FIG. 1, comprising two racks which delimit the storage aisle.

The automated storage system 1 used in the method according to the invention is illustrated in an exemplary embodiment variant in FIG. 1 and comprises at least one rack 2 with several rack supports 3 placed on a ground and extending vertically at least in sections. The storage system 1 according to the invention preferably comprises several racks, as can be seen in FIG. 2. The rack 2 has several storage levels 4 arranged vertically one above the other, each storage level 4 comprising at least one storage space 5. In addition, the storage system 1 according to the invention comprises several storage aids 6 that can be stored in the storage spaces 5. The storage system 1 comprises at least one shuttle 7 comprising a drive unit, the shuttle 7 being movable on the ground by means of the drive unit. In addition, the drive unit preferably comprises at least one electric motor. Moreover, as can be seen in the figures, the drive unit preferably comprises two drive wheels 8 which serve for moving the shuttle 7 along on the ground. The rack supports 3 are preferably manufactured using a strand rolling process or a pressing process. Alternative variants of rack supports 3 are generally known to those skilled in the art. The shuttle 7 is designed for accommodating a storage aid 6 and for supplying it to one of the storage spaces 5 and removing it therefrom. For this purpose, the shuttle 7 preferably has a loading area, which can be seen in FIG. 1 and FIG. 3*a*. Alternatively, the shuttle 7 can also have a receiving space for the storage aid 6, the receiving space being designed for accommodating the storage aid 6. In addition, the storage system 1 comprises a load handling device 9 which is designed for storing the storage aid 6 from the shuttle 7 into the storage space 5 and for retrieving it from the storage space 5 onto the shuttle 7. The load handling device 9 is explained in detail below.

According to the invention, a transfer area 10 is provided between the ground and a lowest storage level 4 of the rack. The transfer area 10 has a height which corresponds at least to a height of the shuttle with a storage aid 6 picked up by the shuttle 7. The shuttle 7 can thereby move below the lowest storage level 4 and can pass through the rack 2. In addition, the shuttle 7 is displaceable along at least one of the rack supports 3 by means of the drive unit. As a result, the shuttle 7 can reach any storage level 4. Preferably, a distance between two adjacent rack supports 3 is chosen such that a shuttle 7 can pass through them. According to the embodiment variant shown in the figures, the distance is chosen such that an axis of the drive wheels 8 of the shuttle 7 is aligned in parallel to a distance between two rack supports 3 delimiting a storage space 5 when the shuttle 7 is being moved below the lowest storage level 4. In the course of coupling the shuttle 7 to the rack support 3, the shuttle 7 performs a turn of essentially 90 degrees so that the axis of the drive wheels 8 is aligned essentially in parallel to the course of the rack, for example normally towards a rack aisle.

According to the preferred embodiment variant of the storage system 1 according to the invention, the rack supports 3 have a coupling-in area 11 for accommodating a shuttle 7 in the region of the transfer area 10. The coupling-in area 11 can be seen in FIG. 1 and FIG. 2. The coupling-in area 11 is preferably designed as a recess in a profile of the rack supports 3 in the transfer area 10. The drive unit of the shuttle 7 preferably has a rack support coupling unit 12, the rack support coupling unit 12 being designed for coupling the shuttle with the rack support 3. The rack support coupling unit 12 can also be seen on the shuttles in FIG. 1. In addition, the rack support coupling unit 12 can be seen in FIGS. 3a to 3e and is described in detail below.

The shuttle 7 can, for example, engage this coupling-in area 11 by means of the rack support coupling unit 12, whereby the shuttle 7 is coupled to the respective rack support 3. The rack supports 3 of the storage system 1 according to the invention preferably do not have any separate mechanisms or devices which enable the shuttle 7 to move along on the rack support 3. According to this embodiment variant, the rack support coupling unit 12 is designed for establishing a frictional connection with the respective rack support 3 in order to enable force transmission.

Figure 3A:
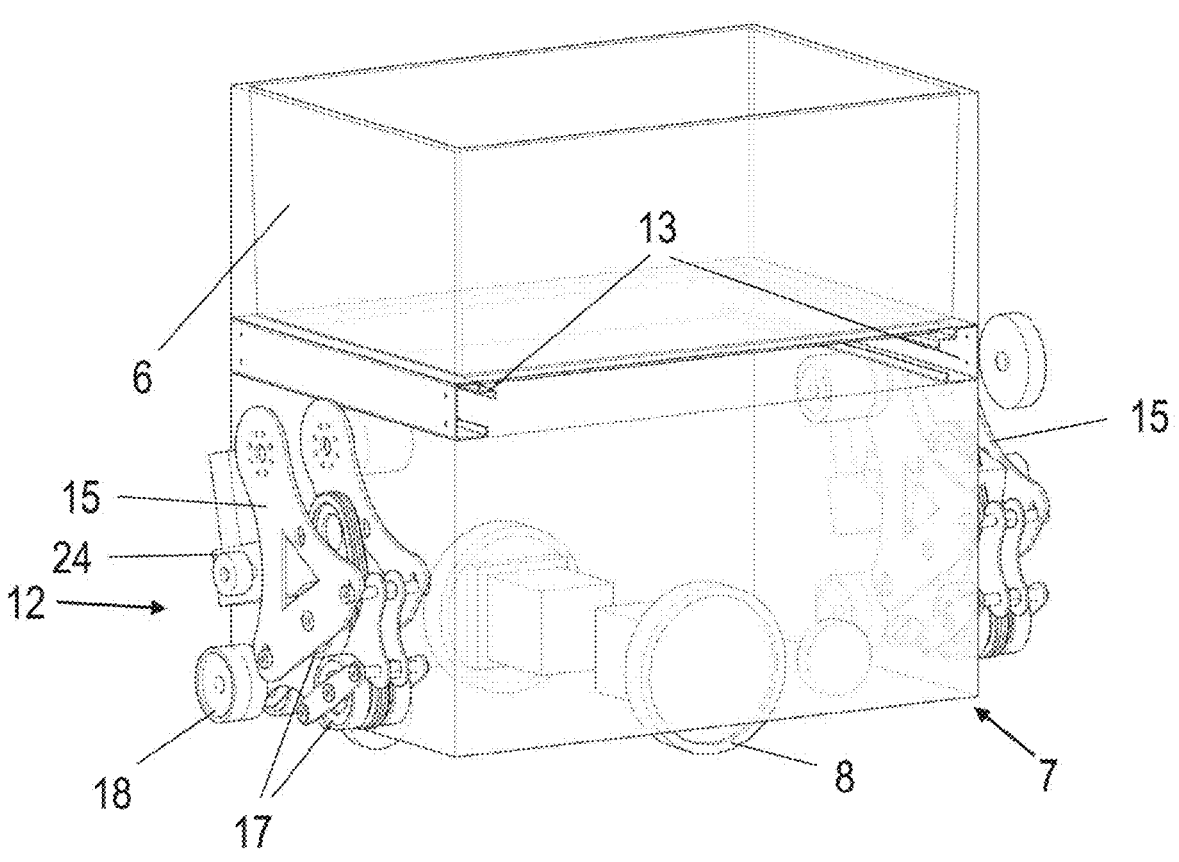

The storage system 1 according to the invention comprises the load handling device 9, which can be seen in a preferred embodiment variant in FIGS. 4b and 4c. The storage spaces 5, which are illustrated in FIGS. 4a to 4c, preferably comprise one guide 13 each for guiding the load handling device 9. According to the embodiment variant which can be seen in the figures, these guides 13 are designed as a pair of rails in which the load handling device 9 runs. In addition, as can be seen in FIG. 3a, the shuttle 7 likewise has a guide 13 designed as a pair of rails, into which the load handling device 9 can be inserted. The load handling device 9 preferably has two pairs of running wheels 14 which run in the rails of the guides 13. The load handling device 9 can thus easily be transferred from the guides 13 in the rack 2 in the area of the storage spaces 5 into the guide 13 of the shuttle 7. Preferably, the load handling device 9 is mechanically and/or electrically connected to the shuttle. In this case, the load handling device 9 can, for example, comprise an electric motor as a drive, with the load handling device 9 being supplied with power by the shuttle 7 by means of a line connection. Alternatively, the load handling device 9 can have its own battery. In addition, the load handling device 9 can comprise a control unit. The control unit is designed for controlling the load handling device 9 depending on the position of the shuttle in the storage system 1. According to a further alternative embodiment variant, the load handling device 9 can be connected to the shuttle 7 via a mechanical drive connection. This can include, for example, a crankshaft, a scissor drive, a chain drive or the like. Further mechanical drive connections will be apparent to those skilled in the art from this exemplary reference. Furthermore, the load handling device 9 preferably comprises bearing areas for at least one storage aid 6. If a storage aid 6 is supplied from a shuttle 7 to a storage space 5, it is transferred from the shuttle 7 to the respective storage space 5 by means of the load handling device or, respectively, it is transferred from the storage space 5 onto the shuttle 7 during retrieval. For this purpose, the load handling device 9 comprises a lifting mechanism or lifting pneumatics which allows the storage aid 6 to be lifted so that it abuts against the bearing areas and can be transferred by means of the load handling device 9. Alternatively, the load handling device 9 can also comprise a gripping mechanism for manipulating the storage aid 6. In a further alternative embodiment variant of the load handling device 9, it comprises a chain conveyor which accommodates a storage aid 6 while the load handling device 9 is pushed underneath the storage aid 6. FIG. 4b shows two storage spaces 5 arranged one above the other with storage aids 6 stored therein, with a load handling device 9 being positioned under each of the storage aids 6. As depicted in FIG. 4c, the respective storage aid 6 is lifted for retrieval by means of the lifting mechanism of the load handling device 9, thereby enabling a transfer of the storage aid 6 onto, for example, a shuttle 7, which is not illustrated. Other lifting mechanisms that are useable are well known to those skilled in the art. The load handling device 9 can, for example, also comprise one or several chain drives and/or one or several belt drives for displacing the storage aids 6. The chains of the chain drives and/or the belts of the belt drives can also form the bearing areas. The guides 13 of the storage spaces 5 are illustrated in detail in FIG. 4a. It is also evident from FIG. 4a that any storage depth in a storage level 4 of the rack 2 can be reached by means of the load handling device 9. Using the load handling device 9, a storage aid 6 can be moved in the rack 2 along the guides 13, whereby several storage aids 6 can be stored one behind the other in the rack 2. Furthermore, this design enables that a load handling device 9 can pass through the entire rack 2 along the guides 13. In a preferred embodiment of the storage system 1 according to the invention, the load handling devices 9 are designed so as to be independent of the shuttles 7 and can move in a storage level 4 independently of the position of a specific shuttle 7. According to this embodiment variant, the load handling devices 9 can also remain within the rack 2, as shown in FIG. 1, while the shuttles 7 supply and/or remove storage aids 6 to and from a storage level 4. Alternatively, a load handling device 9 can be transferred from the guides of the rack 2 into the guide 13 of the shuttle 7 in order to be supplied to another storage level 4, for example, by means of the shuttle 7.

Subsequently, the shuttle 7 and in particular the rack support coupling unit 12 for coupling the shuttle 7 to the rack support 3 will be described. As can be seen in FIG. 1 and FIG. 2, the shuttles 7 of the storage system 1 each comprise at least one rack support coupling unit 12 which allows the shuttle 7 to be coupled into or onto a rack support 3, whereby the shuttle 7 can climb the rack support 3 and can convey a storage aid 6 and/or a load handling device 9 to a specific storage level 4. The connection of the rack support coupling unit 12 with the rack support 3 is preferably established by means of a frictional connection, whereby the rack support 3 can be designed as a simple profile, preferably a rolled profile, and there is no need for additional mechanical components which must be provided on the rack supports 3 in order to allow transfer of the shuttles 7 along the rack supports 3.

In FIGS. 3a to 3e, the shuttle 7 with the rack support coupling unit 12 is illustrated in detail. In the illustrated embodiment variant of the shuttle 7, the rack support coupling unit 12 comprises one coupling arm 15 each on two opposite sides of the shuttle 7. Each of the coupling arms 15 is pivotally connected to the shuttle 7 at a pivotal point 16. As a result, it becomes possible that the coupling arms 15 perform a rotary movement on the shuttle 7 and the shuttle 7 with a storage aid 6 it has possibly accommodated still remains in an upright orientation. For performing the position correction of the shuttle 7, a servomotor 24 engaging at the pivotal point 16 can also be provided.

Figure 3B:
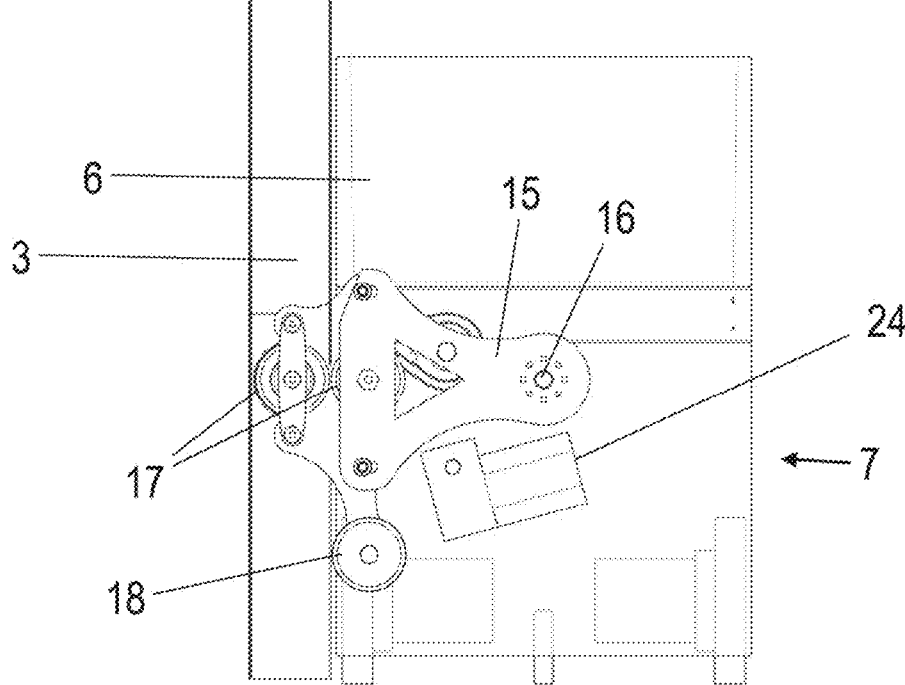
Figure 3C:
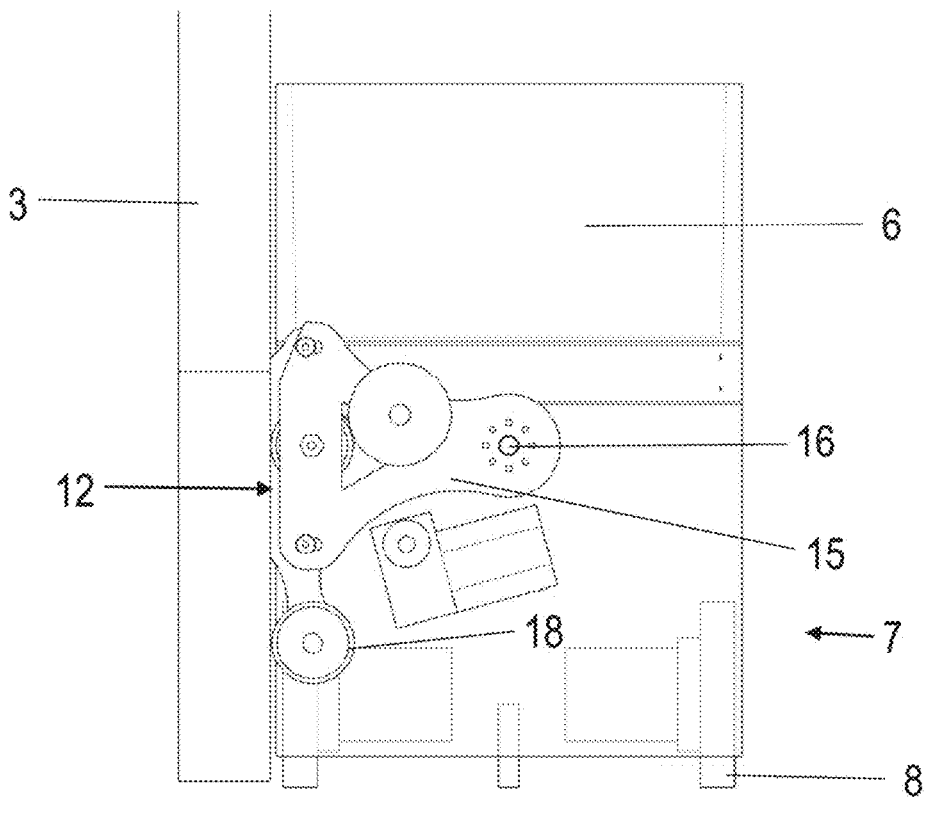
Figure 3D:
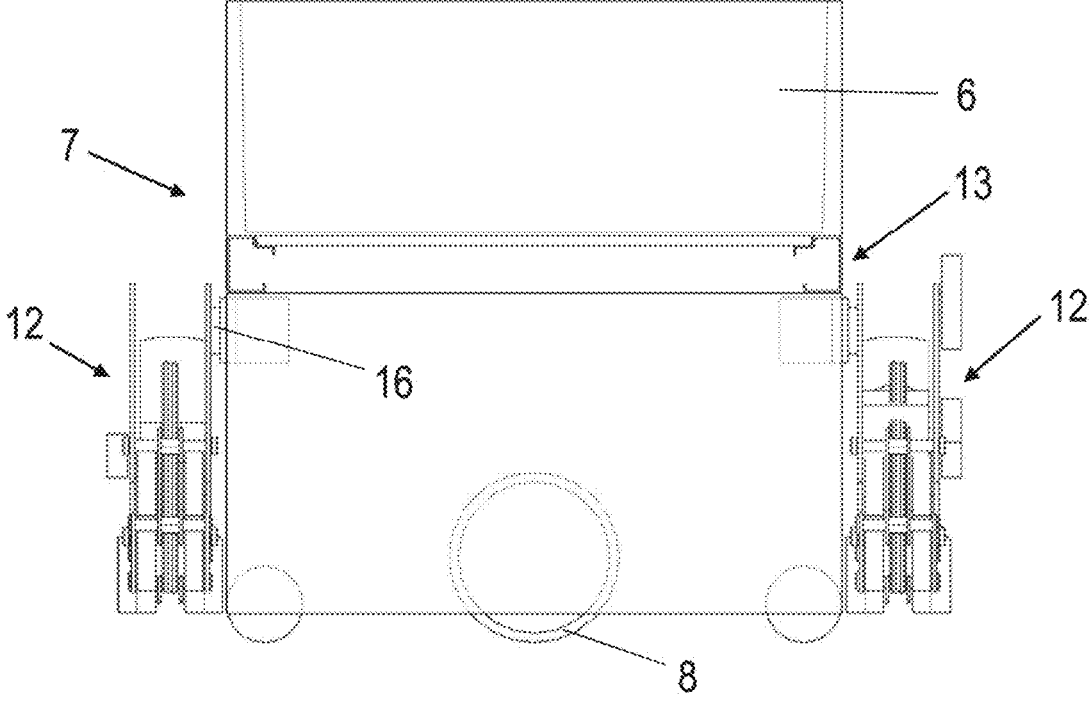
Figure 3E:
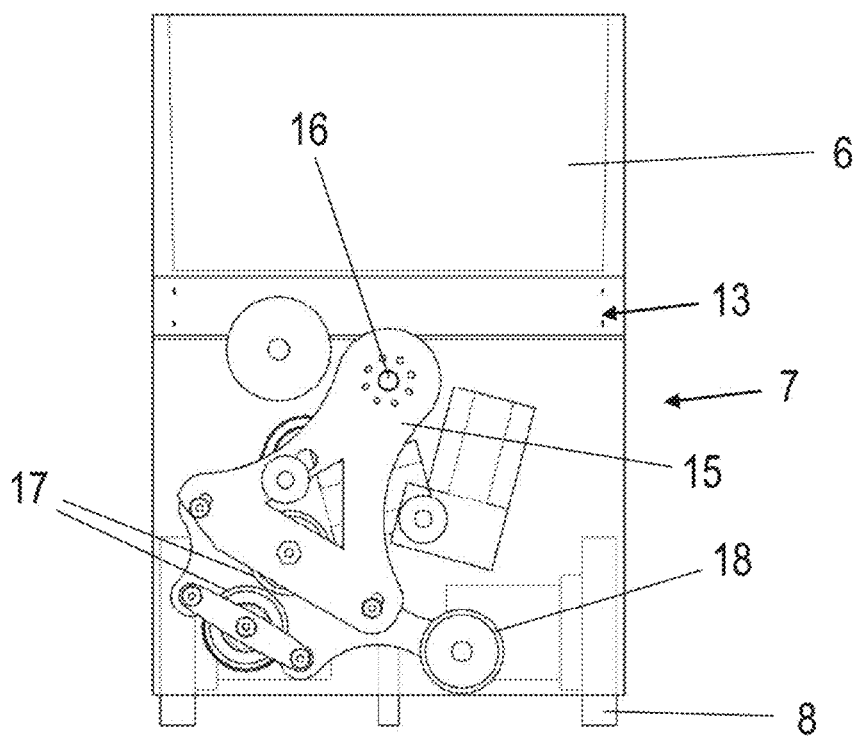

Each of the coupling arms 15 comprises a plurality of rollers, with at least some of the rollers resting against the rack support 3 in the shuttle's state of having been coupled in at one of the rack supports 3. FIG. 3a shows an exemplary embodiment of the shuttle 7 in a decoupled state, and FIGS. 3b and 3c show the shuttle 7 in a state of having been coupled in at a rack support 3 or, respectively, during the act of coupling in. In this connection, FIG. 3b shows a cross-section through the rack support, and FIG. 3c shows the rack support 3 in an external view.

In the embodiment variant of the rack support coupling unit 12 which is illustrated in the figures, the coupling arm 15 comprises two drive rollers 17 and one guide roller 18. The two drive rollers 17 thereby clamp the rack support 3 at least partially during the process of coupling in and are driven preferably by means of a chain drive or a belt drive. In this case, the chain drive or, respectively, the belt drive are preferably connected to the drive unit of the shuttle 7. In addition, the coupling arm 15 preferably comprises the guide roller 18, which is arranged on the coupling arm 15 at a distance from the two drive rollers 17. In this case, at least one of the drive rollers 17 is designed so as to be narrower than the guide roller 18. If the shuttle 7 approaches the rack support 3, the coupling-in area 11 of the rack support 3 allows one of the drive rollers 17 to engage into an internal area of a rack support 3 designed as a hollow profile. For this purpose, the coupling-in area 11 is designed as an opening in a side wall of the rack support 3. Moreover, the rack support 3 comprises a slot 19 which runs essentially along the entire height of the rack support 3. The slot 19 is designed so as to be narrower than the opening in the coupling-in area 11, but allows the belt of the belt drive or, respectively, the chain of the chain drive to be passed through from an external area of the rack support 3 into the internal area. If the guide roller 18 abuts against the rack support 3, the coupling arm 15 is pivoted in such a way that one of the drive rollers 17 is arranged in the internal area of the rack support 3 and one of the drive rollers 17 abuts against the rack support 3 from the outside. This state can be seen in FIG. 3b. Since the weight of the shuttle 7 possibly with a storage aid 6 essentially rests against an end of the coupling arm 15, which end is opposite to the drive rollers 17, a clamping force is exerted on the rack support 3 or, respectively, high normal forces are exerted on the drive rollers 17, whereby a large frictional force is generated between the drive rollers 17 and the rack support 3. This frictional force is used for moving the shuttle 7 along the rack supports 3.

Figure 5A:
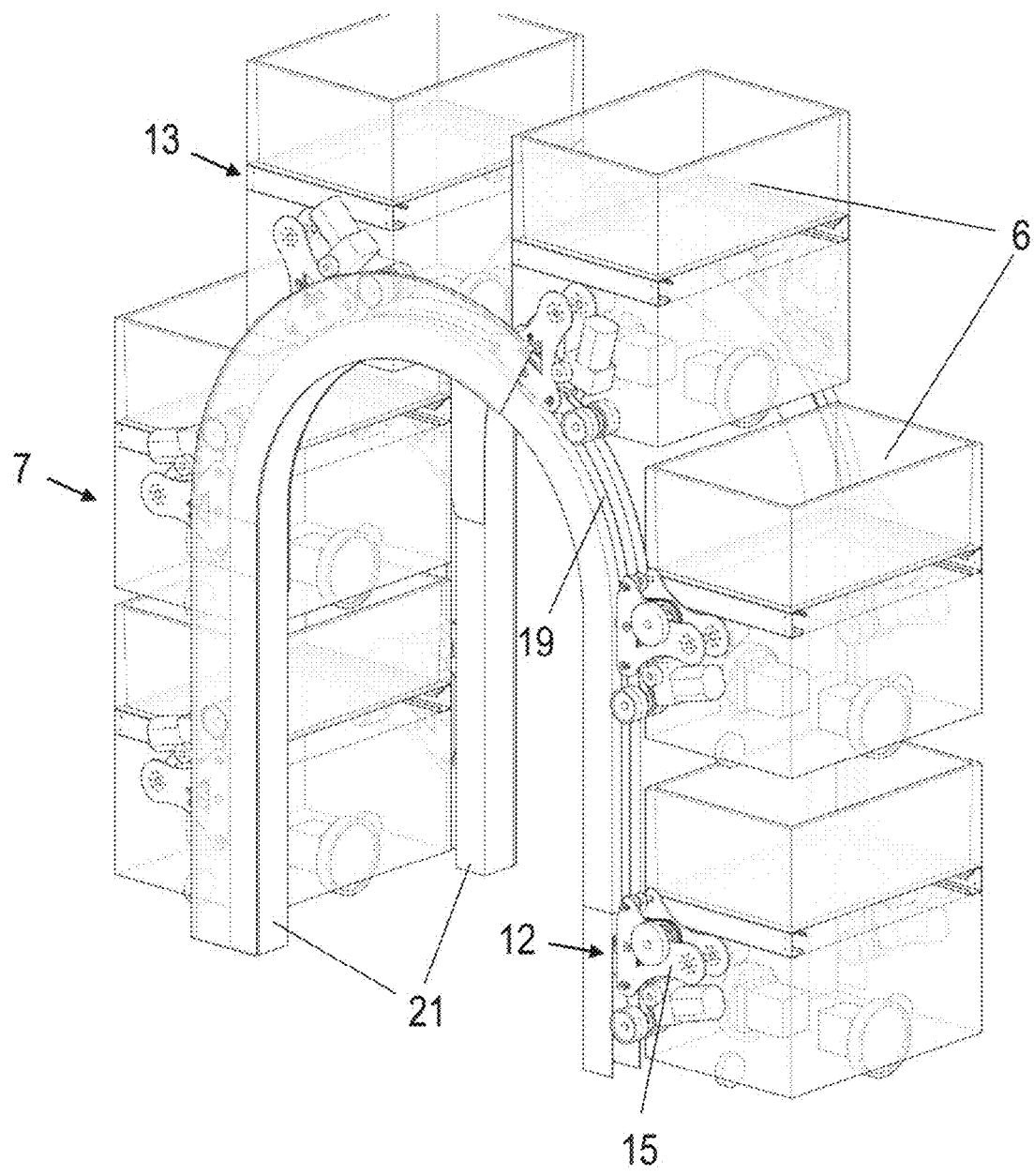
Figure 5B:
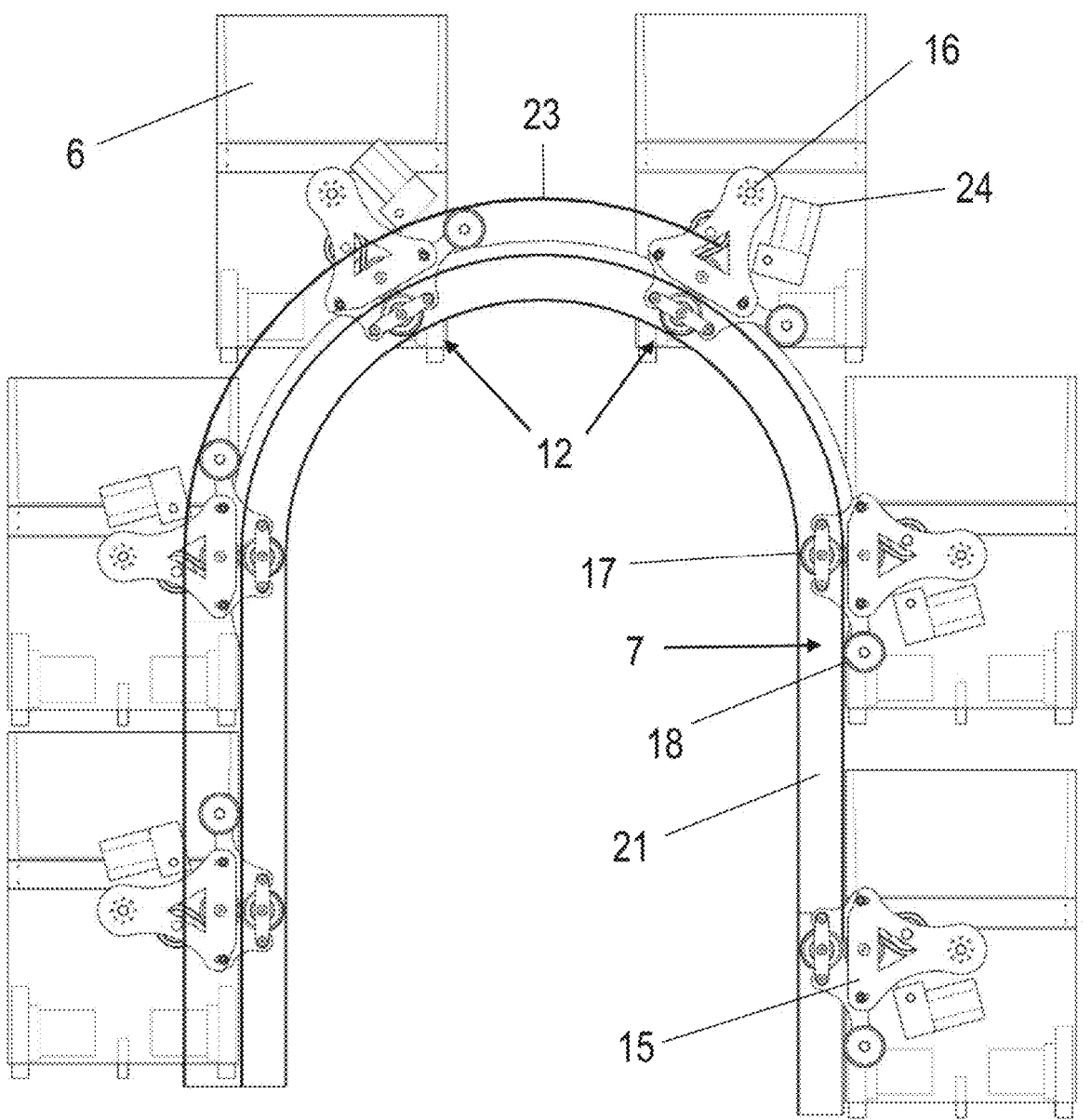
Figures 5C, 5D:
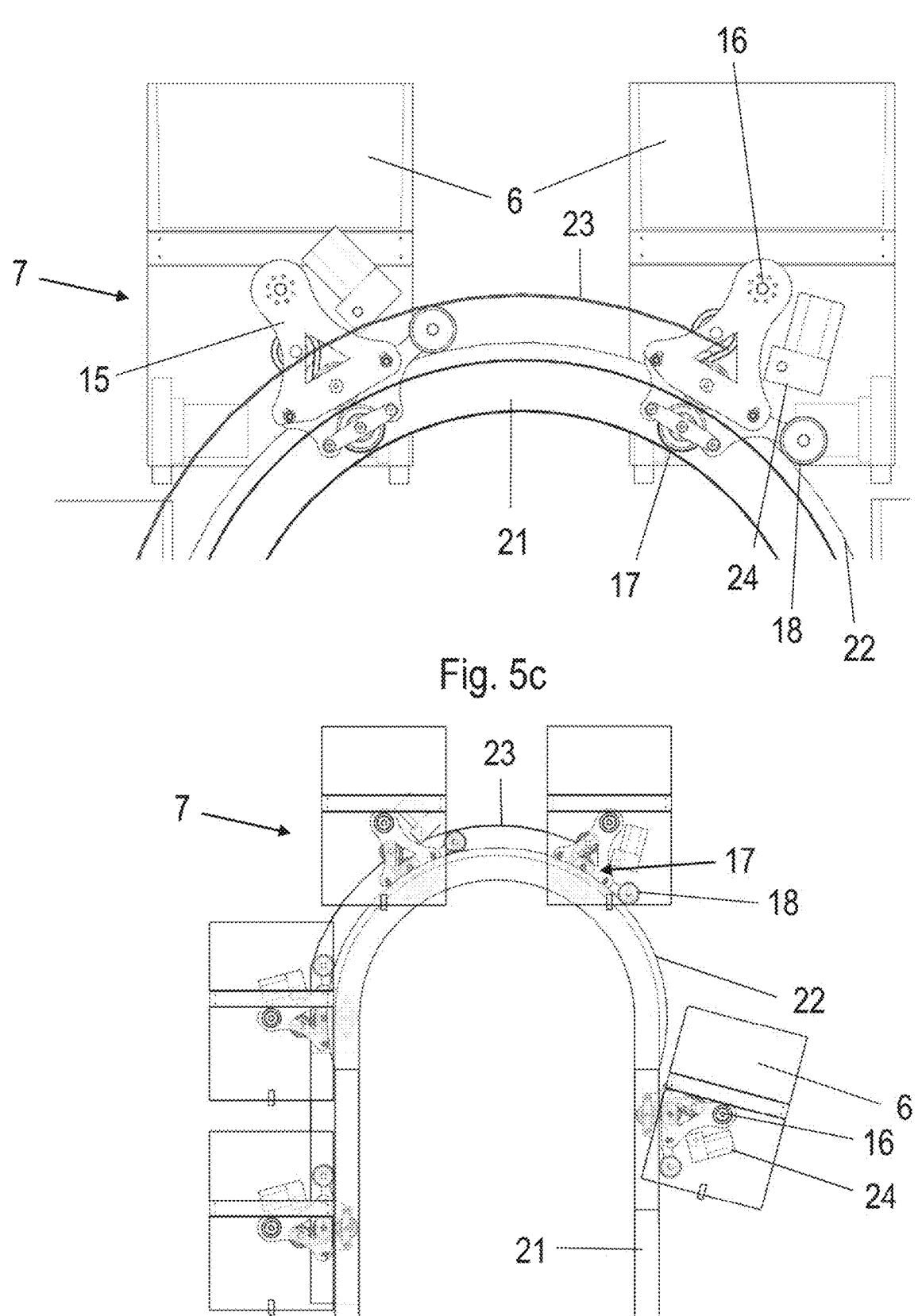

The design according to the invention of the shuttle 7 with the rack support coupling unit 12 furthermore allows the shuttle 7 to be guided along a curve or, respectively, along an arc of a support 21. Preferably, the support 21 is structurally designed like the above-described rack support 3, with the support 21 additionally comprising an arc or, respectively, a curve. This can be seen in FIGS. 5a to 5e. Since the shuttle 7 is pivotally connected to the coupling arm 15, the rack support coupling unit 12 enables the position of the shuttle 7 to be corrected in relation to the course of the support 21 when the arc is being passed through. It thereby becomes possible to guide the support in a curve, with the shuttle 7 independently performing a position correction with a storage aid 6 it has accommodated. As a result, the shuttle 7 maintains an upright orientation, regardless of the course of the support 21. For performing the position correction, the servomotor 24 engaging at the pivotal point 16 between the shuttle 7 and the coupling arm 15 and actively pivoting the shuttle 7 relative to the coupling arm 15 can also be provided. The pivoting of the shuttle 7 when passing through the arc of the support 21 is illustrated in FIGS. 5c and 5d. In addition, the servomotor 24 can enable a change in the position of the shuttle 7 also at a position of the shuttle 7 on a substantially vertically extending section of the support 21, as can be seen in FIG. 5d. This enables simple ergonomic removal or simple ergonomic insertion of goods into the storage aid 6.

When passing through the arc of the support 21, the load on the drive rollers 17 and the guide roller 18 changes due to gravity and the orientation of the coupling arm 15. In order to ensure a high and uniform clamping force of the drive rollers 17 on the support 21, it is advantageous to make sure that the high normal forces which act on the drive rollers 17 are maintained even when passing through the arc. This is ensured by an inner roller guide 22, which can be seen in FIG. 5d, and an outer roller guide 23, which are connected to the support 21 and are designed for guiding the guide roller 18. When the shuttle 7 enters into the arc, the guide roller 18 is forced by the inner roller guide 22 onto a curve which has an enlarged radius in comparison to the area of the support 21 which is clamped by the drive rollers 17. Furthermore, in the course of passing through the arc, the guide roller 18 engages with the outer roller guide 23, which is located opposite to the inner roller guide 22 along the arc at least in sections. As a result, it is ensured that the guide roller 18 will not lift off from the inner roller guide 22. The guide roller 18 thus runs along the arc of the support 21 at least in sections between the inner roller guide 22 and the outer roller guide 23. As a result, it is ensured that the drive rollers 17 exert a clamping force on the support essentially during the entire time of passing through the arc of the support 21, which clamping force is oriented perpendicular or, respectively, at right angles to the support 21. In this way, a high frictional force between the support 21 and the drive rollers 17 is ensured so that the drive rollers 17 are prevented from slipping through on the support 21.

According to an embodiment variant of the coupling arm 15 which is schematically illustrated in FIG. 6a and FIG. 6b, the coupling arm 15 comprises a joint 27 between the drive rollers 17 and the pivotal point 16, as well as a first sub-arm 25 and a second sub-arm 26. As a result, the advantage is obtained that a distance between the drive rollers 17 and the pivotal point 16 of the coupling arm 15 can be varied, preferably continuously, by means of the joint 27. Due to the position of the joint 27, a curve 28, which can be followed by a point of application 29 of the drive rollers 17 in relation to the pivotal point 16, can be varied by changing the geometry of the coupling arm 15. FIG. 6a and FIG. 6b show two different exemplary curves 29, which can be followed by the point of application 29 according to this embodiment variant. As a result, the advantage is obtained that the position of the point of application 29 can be chosen such that said point will not collide with any other components of the shuttle 7 or the storage system 1 when the shuttle 7 is being coupled into the support 21 and decoupled therefrom. A simple, quick, safe and smooth coupling and decoupling process is ensured in this way.

Figure 5E:
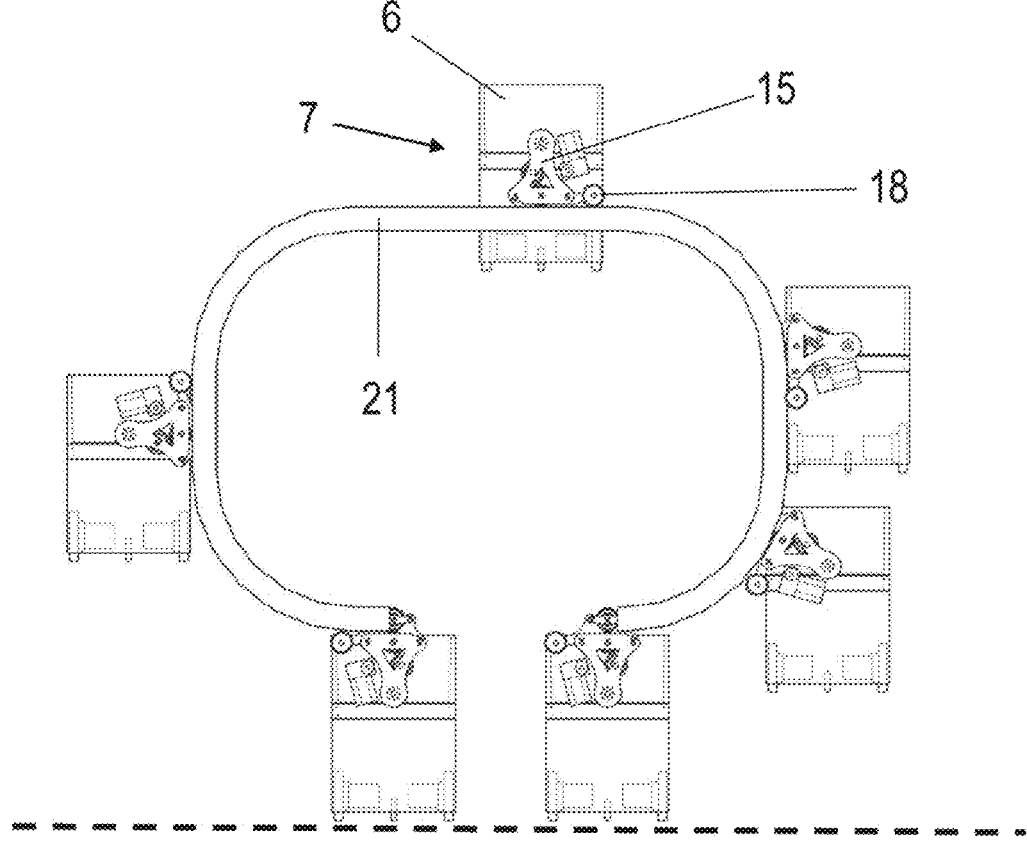

FIG. 5e shows the support 21 with several arcs. In this embodiment variant, the support 21 preferably comprises several arcs as described above, which cause a curvature in the support 21 so that the latter runs in parallel to the ground at least in sections or on a point-by-point basis. The ground is marked with a dashed line in FIG. 5e. In addition, the support 21 can comprise a coupling-in area 11 in the sections parallel to the ground, or, as shown in FIG. 5e, it can end at the points that are parallel to the ground. As a result, the advantage is obtained that the shuttle 7 can simply be coupled into the support 21 in the coupling-in area 11, which is aligned in parallel to the ground, and can be decoupled therefrom. Alternatively, as shown in FIG. 5e, the shuttle can simply be coupled into the support 21 and can be decoupled therefrom at the points that are parallel to the ground. A support 21 with multiple arcs can also be designed in such a way that different levels above ground can be achieved. Furthermore, transfer of shuttles 7 between several different grounds that are located at different height levels can be achieved in this way. This is useful especially if the storage system 1 according to the invention extends across several halls with different zero levels, or in order to reach different levels of the workstations 20.

FIG. 7 shows the automated storage system 1 according to the invention in a schematic view from above with several workstations 20. In addition, a plurality of shuttles 7 can be seen in FIG. 7. In this case, the shuttles 7 convey storage aids 6 between the workstations 20 and the racks 2 of the storage system 1.

In order to supply a storage aid 6 to a workstation 20 and to remove it from there, at least one support 21 with an arc according to FIGS. 5a to 5e is preferably provided at each workstation 20 in the storage system 1 according to the invention.

The method according to the invention of storing or retrieving storage aids 6 with a shuttle 7 in a rack 2 of the automated storage system 1 will now be explained with reference to FIG. 1. As already explained, the rack 2 comprises several rack supports 3 placed on a ground and several storage levels 4 arranged vertically one above the other and comprising storage spaces 5 arranged between the rack supports 3. According to the invention, adjacent rack supports 3 of the rack 2 which limit the width of a storage space 5 have a clear width on the ground that is smaller than the length of the shuttle 7 in a longitudinal axis of the shuttle 7 and larger than the width of the shuttle 7 in a transverse axis of the shuttle 7.

In the method according to the invention, the shuttle 7 is moved underneath the rack 2 on the ground. This can be seen in FIG. 1, in which the second shuttle 7 moves underneath the rack 2 from the left. In addition, the method according to the invention comprises coupling the shuttle 7 to adjacent rack supports 3. The first shuttle 7 in the foreground of FIG.

1 is depicted during this coupling process. Moreover, the method according to the invention comprises a vertical ascent of the shuttle 7 on these adjacent rack supports 3 up to the height of the storage level 4 of the storage space 5 into which the storage aid 6 is to be stored or from which the storage aid 6 is to be retrieved. In FIG. 1, the shuttle 7 is shown on the left side of FIG. 1 during this vertical ascent. In addition, the method according to the invention comprises storing the storage aid 6 from the shuttle 7 into the storage space 5 or retrieving the storage aid 6 from the storage space 5 onto the shuttle 7, as well as a vertical descent of the shuttle 7 on the adjacent rack supports 3 down to the ground. Furthermore, the method according to the invention comprises moving out of the rack 2 and/or moving in under the rack 2 on the ground by the shuttle 7 with a direction of travel along the longitudinal axis of the shuttle 7. This is also illustrated in FIG. 1, in which the second shuttle 7 moves in from the left along its longitudinal axis underneath the rack 2. In addition, the method according to the invention comprises rotating the shuttle 7 by 90 degrees outside of the rack 2. This is evident from the fact that the third shuttle 7 and the fourth shuttle 7 from the left in the foreground of FIG. 1 are rotated in comparison to the second shuttle 7 from the left by 90 degrees. Furthermore, the method according to the invention comprises coupling the shuttle 7 by approaching only two of the adjacent rack supports 3, with the longitudinal axis of the shuttle 7 being positioned essentially in parallel to a rack front of the rack 2. As can be seen in FIG. 1, the first shuttle 7 from the right in the foreground approaches the only two rack supports 3.

In the method according to the invention, the shuttle 7 is preferably positioned in front of the only two adjacent rack supports 3 before being coupled to the only two adjacent rack supports 3 by approaching the only two adjacent rack supports 3 with a direction of travel along the transverse axis of the shuttle 7. In this way, the advantage is obtained that the shuttle can directly approach the rack supports and a simple mechanism for coupling to the two adjacent rack posts can be implemented.

According to the preferred embodiment of the method according to the invention, the shuttle 7 is positioned in front of the only two adjacent rack supports 3 with a movement in the direction of travel of the longitudinal axis of the shuttle 7 after it has been rotated and before it is coupled to the only two adjacent rack supports 3. As a result, the rack aisles can also be used for the travel of the shuttle 7. In addition, the shuttles 7 can thereby avoid each other within the rack aisle or can pass by each other.

After moving underneath the rack 2, the shuttle 7 preferably moves on the ground in an oncoming traffic area with other shuttles 7, which have a direction of travel that is oriented essentially opposite to the shuttle 7. As a result, the direction of travel of the individual shuttles 7 can be coordinated with each other, and the individual shuttles 7 can move autonomously in the storage system 1.

According to the preferred embodiment of the method according to the invention, the vertical ascent and/or the vertical descent of the shuttle 7 is performed on the only two adjacent rack supports 3 by means of a friction wheel coupling. A particularly quick coupling and decoupling process with a structurally simple and robust coupling mechanism is ensured in this way.

The shuttle 7 preferably has a load handling device 9 for accommodating the storage aid 6, wherein the load handling device 9 with the storage aid 6 picked up by the load handling device 9 is moved from a guide 13 for the load handling device 9 which is provided on the shuttle 7 into a guide 13 for the load handling device 9 which is provided on the storage space 5, when the storage aid 6 is stored from the shuttle 7 into the storage space 5. When the storage aid 6 is retrieved from the storage space 5 onto the shuttle 7, the storage aid 6 is picked up by the load handling device 9 and the load handling device 9 with the accommodated storage aid 6 is preferably moved from the guide 13 for the load handling device 9 which is provided on the storage space 5 into the guide 13 for the load handling device 9 which is provided on the shuttle 7. In this way, it is ensured that the storage aid 6 is stored and retrieved safely. Furthermore, the load handling device 9 is preferably controlled by means of a control unit depending on the position of the shuttle 7 in the storage system 1. As a result, the coordination between the load handling device 9, the storage aid 6 and the shuttle 7 is improved.

The invention claimed is:

1. A method of storing or retrieving storage aids with a shuttle in a rack of an automated storage system, wherein the rack comprises several rack supports placed on a ground and several storage levels arranged vertically one above the other and comprising storage spaces arranged between the rack supports, and wherein adjacent rack supports of the rack which limit a width of a storage space have a clear width on the ground that is smaller than a length of the shuttle in a longitudinal axis of the shuttle and larger than the width of the shuttle in a transverse axis of the shuttle, and wherein the following steps are performed in the method:
   moving underneath the rack with the shuttle on the ground;
   coupling the shuttle to adjacent rack supports;
   a vertical ascent of the shuttle on these adjacent rack supports up to a height of the storage level of the storage space into which the storage aid is to be stored or from which the storage aid is to be retrieved;
   storing the storage aid from the shuttle into the storage space or retrieving the storage aid from the storage space onto the shuttle;
   a vertical descent of the shuttle on the adjacent rack supports down to the ground;
characterized in that the method comprises the following further steps:
   moving out of the rack and/or moving in under the rack on the ground by the shuttle with a direction of travel along the longitudinal axis of the shuttle;
   rotating the shuttle by 90 degrees outside of the rack;
   coupling the shuttle by approaching only two of the adjacent rack supports, with the longitudinal axis of the shuttle being positioned essentially in parallel to a rack front of the rack.

2. The method according to claim 1, characterized in that the shuttle is positioned with a direction of travel along the transverse axis of the shuttle before being coupled to the only two adjacent rack supports by approaching the only two adjacent rack supports.

3. The method according to claim 1, characterized in that the shuttle is positioned in front of the only two adjacent rack supports with a movement in the direction of travel of the longitudinal axis of the shuttle after the shuttle has been rotated and before it is coupled to the only two adjacent rack supports.

4. The method according to claim 1, characterized in that, after moving underneath the rack, the shuttle moves on the ground in an oncoming traffic area with other shuttles, which have a direction of travel that is oriented essentially opposite to the shuttle.

5. The method according to claim 1, characterized in that the vertical ascent and/or the vertical descent of the shuttle is performed on the only two adjacent rack supports by means of a friction wheel coupling.

6. The method according to claim 1, characterized in that the shuttle has a load handling device for accommodating the storage aid, wherein the load handling device with the storage aid picked up by the load handling device is moved from a guide for the load handling device which is provided on the shuttle into a guide for the load handling device which is provided on the storage space, when the storage aid (6) is stored from the shuttle into the storage space.

7. The method according to claim 1, characterized in that the shuttle has a load handling device for accommodating the storage aid, wherein the storage aid is picked up by the load handling device and the load handling device with the accommodated storage aid is moved from a guide for the load handling device which is provided on the storage space into a guide for the load handling device which is provided on the shuttle, when the storage aid is retrieved from the storage space onto the shuttle.

8. The method according to claim 6, characterized in that the load handling device is controlled by means of a control unit depending on the position of the shuttle in the storage system.

9. The method of claim 7, characterized in that the load handling device is controlled by means of a control unit depending on the position of the shuttle in the storage system.

10. The method according to claim 2, characterized in that the shuttle is positioned in front of the only two adjacent rack supports with a movement in the direction of travel of the longitudinal axis of the shuttle after the shuttle has been rotated and before it is coupled to the only two adjacent rack supports.

11. The method according to claim 2, characterized in that, after moving underneath the rack, the shuttle moves on the ground in an oncoming traffic area with other shuttles, which have a direction of travel that is oriented essentially opposite to the shuttle.

12. The method according to claim 2, characterized in that the vertical ascent and/or the vertical descent of the shuttle is performed on the only two adjacent rack supports by means of a friction wheel coupling.

13. The method according to claim 2, characterized in that the shuttle has a load handling device for accommodating the storage aid, wherein the load handling device with the storage aid picked up by the load handling device is moved from a guide for the load handling device which is provided on the shuttle into a guide for the load handling device which is provided on the storage space, when the storage aid is stored from the shuttle into the storage space.

14. The method according to claim 2, characterized in that the shuttle has a load handling device for accommodating the storage aid, wherein the storage aid is picked up by the load handling device and the load handling device with the accommodated storage aid is moved from a guide for the load handling device which is provided on the storage space into a guide for the load handling device which is provided on the shuttle, when the storage aid is retrieved from the storage space onto the shuttle.

15. The method according to claim 10, characterized in that, after moving underneath the rack, the shuttle moves on the ground in an oncoming traffic area with other shuttles, which have a direction of travel that is oriented essentially opposite to the shuttle.

16. The method according to claim 15, characterized in that the vertical ascent and/or the vertical descent of the shuttle is performed on the only two adjacent rack supports by means of a friction wheel coupling.

17. The method according to claim 16, characterized in that the shuttle has a load handling device for accommodating the storage aid, wherein the load handling device with the storage aid picked up by the load handling device is moved from a guide for the load handling device which is provided on the shuttle into a guide for the load handling device which is provided on the storage space, when the storage aid is stored from the shuttle into the storage space.

18. The method according to claim 17, characterized in that the shuttle has a load handling device for accommodating the storage aid, wherein the storage aid is picked up by the load handling device and the load handling device with the accommodated storage aid is moved from a guide for the load handling device which is provided on the storage space into a guide for the load handling device which is provided on the shuttle, when the storage aid is retrieved from the storage space onto the shuttle.

19. The method according to claim 3, characterized in that the shuttle has a load handling device for accommodating the storage aid, wherein the storage aid is picked up by the load handling device and the load handling device with the accommodated storage aid is moved from a guide for the load handling device which is provided on the storage space into a guide for the load handling device which is provided on the shuttle, when the storage aid is retrieved from the storage space onto the shuttle.

* * * * *